United States Patent
Schiff

(10) Patent No.: US 7,595,617 B2
(45) Date of Patent: Sep. 29, 2009

(54) SWITCHING POWER SUPPLY CONTROL

(75) Inventor: Tod F. Schiff, Portland, OR (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 866 days.

(21) Appl. No.: 11/109,466

(22) Filed: Apr. 18, 2005

(65) Prior Publication Data

US 2006/0055385 A1 Mar. 16, 2006

Related U.S. Application Data

(60) Provisional application No. 60/610,024, filed on Sep. 14, 2004.

(51) Int. Cl.
*G05F 1/40* (2006.01)
(52) U.S. Cl. .................................... 323/282
(58) Field of Classification Search ................ 323/282, 323/283, 288
See application file for complete search history.

(56) References Cited

U.S. PATENT DOCUMENTS

| | | | |
|---|---|---|---|
| 6,057,675 A * | 5/2000 | Tateishi | 323/283 |
| 6,791,306 B2 | 9/2002 | Walters et al. | |
| 6,683,441 B2 | 1/2004 | Schiff et al. | |
| 6,943,535 B1 | 9/2005 | Schiff | |
| 7,005,836 B1 * | 2/2006 | Rice | 323/288 |

* cited by examiner

*Primary Examiner*—Adolf Berhane
(74) *Attorney, Agent, or Firm*—Robert F. Hightower

(57) ABSTRACT

A switching power supply controller includes a comparator to compare a feedback signal to a first limit and a second limit, one of which includes a ramp. Limit generators may be used to generate limit signals in response to power supply signals, control signals, and/or output signals. An error amplifier may be used to generate the feedback signal in response to an output signal and an input control signal. A switching power supply may alternatively include an oscillator that shifts the switching frequency in response to the input control signal.

8 Claims, 4 Drawing Sheets

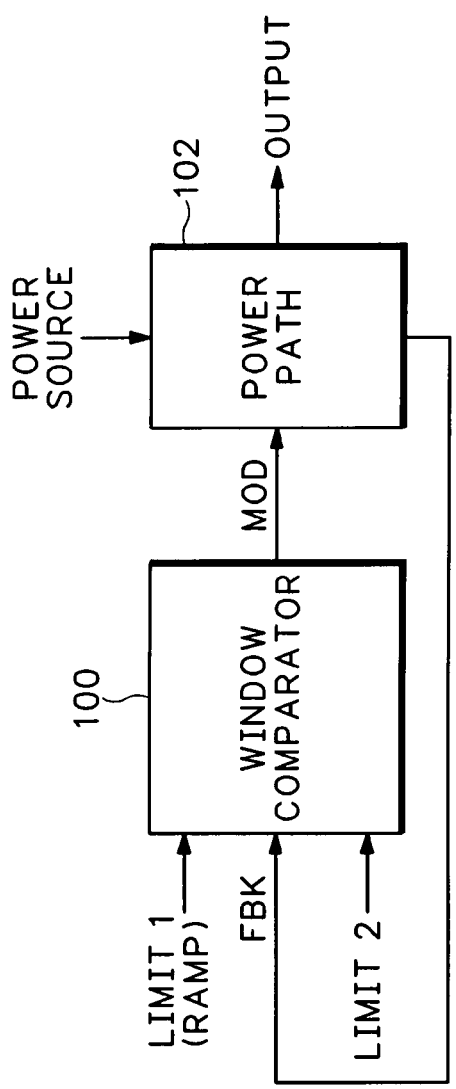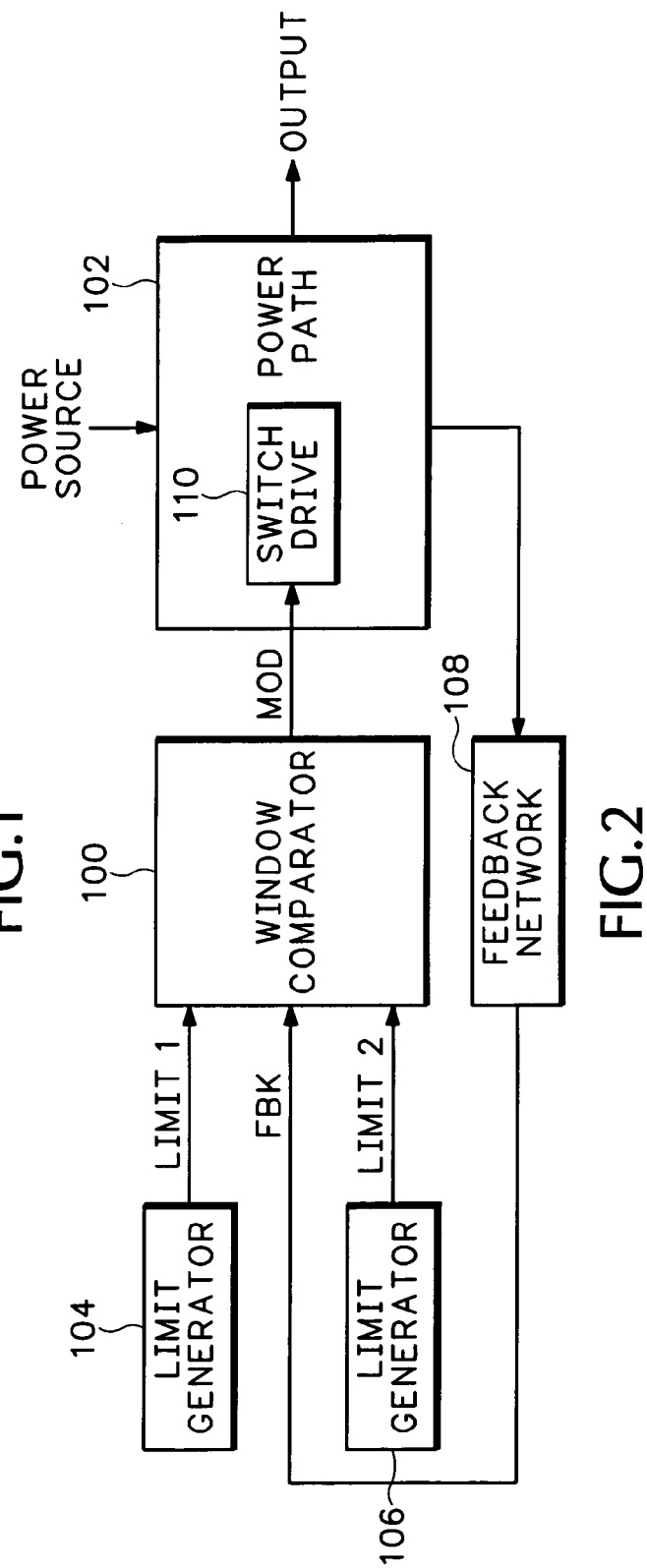

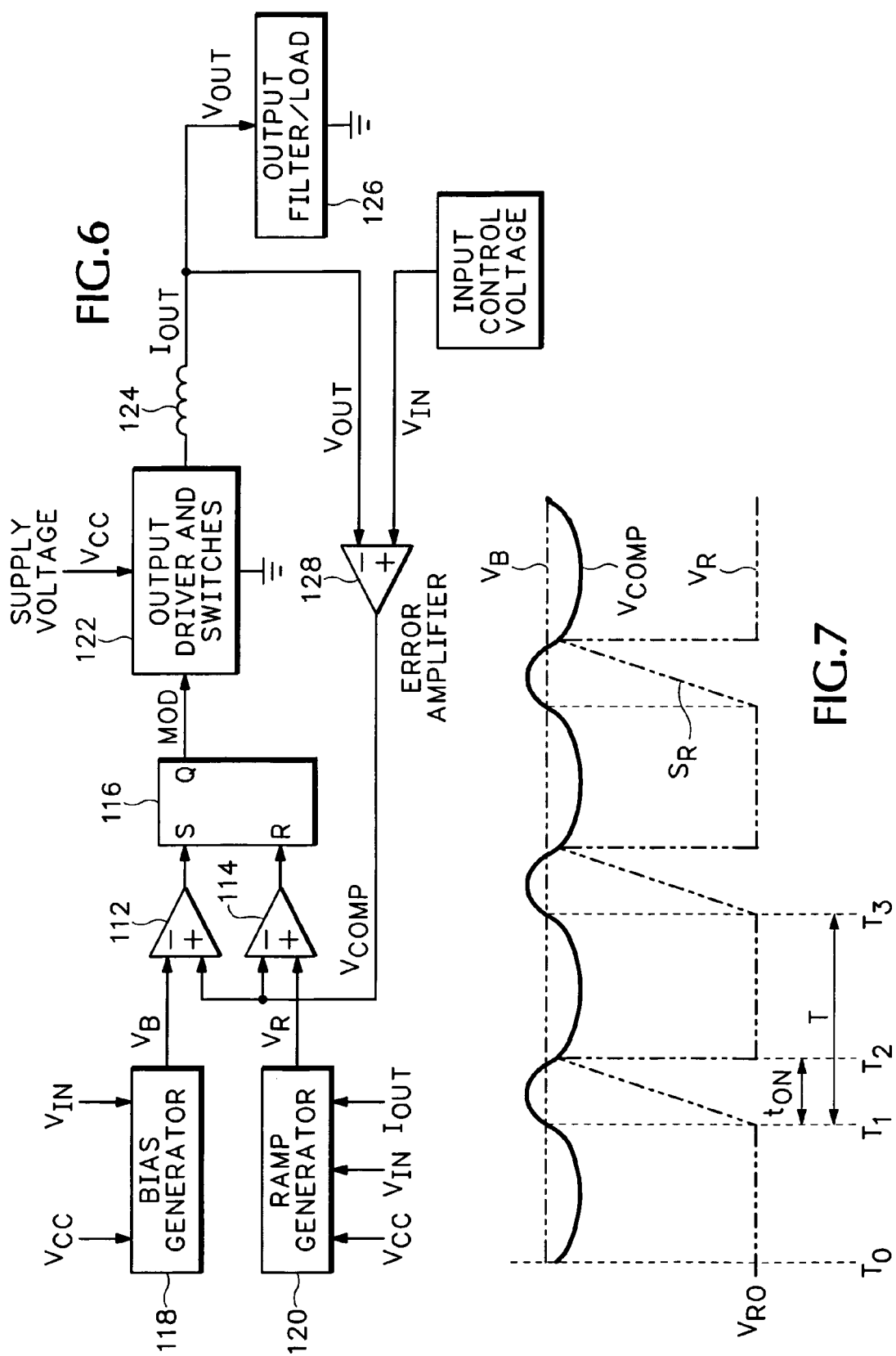

US 7,595,617 B2

SWITCHING POWER SUPPLY CONTROL

This application claims priority from U.S. Provisional Application Ser. No. 60/610,024 entitled Switching Power Supply Modulation Control Technique, filed Sep. 14, 2004, which is incorporated by reference.

BACKGROUND

Numerous techniques have been used to control switching power supplies. One of the most common is know as pulse-width modulation (PWM) in which the switching frequency is held constant while the duty cycle is modulated to control the output. Another common technique is known as pulse frequency modulation (PFM) in which the switch on-time or off-time is held constant, and the frequency is modulated to control the output. In another technique known as hysteretic control (or ripple regulation) frequency and duty cycle are varied so as to keep the output ripple constant.

BRIEF DESCRIPTION OF THE DRAWINGS

FIG. 1 illustrates an embodiment of a switching power supply utilizing a controller arranged according to the inventive principles of this patent disclosure.

FIG. 2 illustrates another embodiment of a switching power supply utilizing a controller arranged according to the inventive principles of this patent disclosure.

FIG. 6 illustrates another embodiment of a switching power supply utilizing a controller that combines and synthesizes several of the inventive principles of this patent disclosure.

FIG. 7 illustrates example waveforms of signals that may be obtained with the system of FIG. 6.

DETAILED DESCRIPTION

Figure 3:
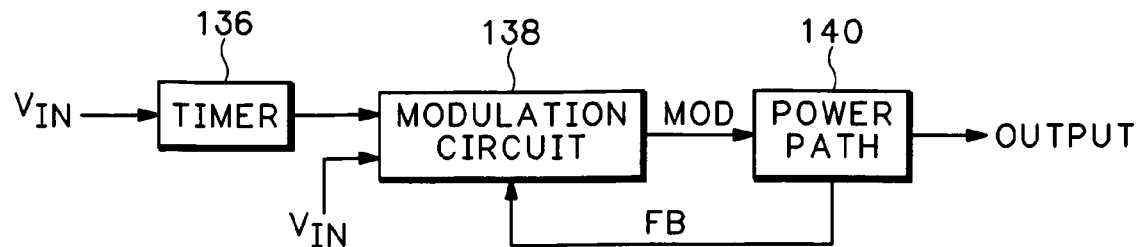
FIG. 3 illustrates another embodiment of a switching power supply utilizing a controller arranged according to the inventive principles of this patent disclosure.

This patent disclosure encompasses multiple inventions relating to switching power supplies. These inventive principles have independent utility and are independently patentable. In some cases, additional benefits are realized when some of the principles are utilized in various combinations with one another, thus giving rise to yet more patentable inventions. These principles can be realized in countless different embodiments. Although some specific details are shown for purposes of illustrating the preferred embodiments, other effective arrangements can be devised in accordance with the inventive principles of this patent disclosure. Thus, the inventive principles are not limited to the specific details disclosed herein.

Window Comparison with Ramp as Limit

FIG. 1 illustrates an embodiment of a switching power supply utilizing a controller arranged according to the inventive principles of this patent disclosure. The embodiment of FIG. 1 includes a window comparator 100 that generates a modulation signal MOD by comparing a feedback signal FBK to first and second limits LIMIT 1 and LIMIT 2, at least one of which includes a ramp. A power path 102 controls the flow of power from a power source to the output in response to the modulation signal MOD. The power path may embrace any suitable switching power supply topology and therefore may include any suitable number and combination of switches, transformers, inductors, capacitors, diodes, and the like. The feedback signal FBK represents any suitable operating parameter of the power path, for example, an output voltage, an output current, or the voltage or current through a specific inductor, switch, diode, etc. In the embodiment of FIG. 1, the first limit LIMIT 1 is identified as including a ramp, but LIMIT 2 may also include a ramp in addition to, or instead of, LIMIT 1, but at least one of the limits includes a ramp. If both limits include ramps, they may be dependent or independent of each other. A limit that does not include a ramp may include a bias signal which is not a ramp, for example, a DC or quasi-DC signal.

FIG. 2 illustrates another embodiment of a switching power supply utilizing a controller arranged according to the inventive principles of this patent disclosure. In the embodiment of FIG. 2, the first and second limits LIMIT 1 and LIMIT 2 are generated by limit generators 104 and 106, respectively. A feedback network 108 generates the feedback signal FBK in response to an output signal from the power path 102, which may include a switch drive circuit 110 to provide additional drive power if the modulation signal is not powerful enough to drive the switch or switches in the power path. The comparator may include circuitry to perform any additional logic or signal processing functions to generate the modulation signal. The modulation signal may include multiple signals depending on the switching topology, e.g., a single switch in a buck converter versus multiple switches in a bridge configuration.

Input Control Voltage Dependent Frequency Shift

Figure 4:
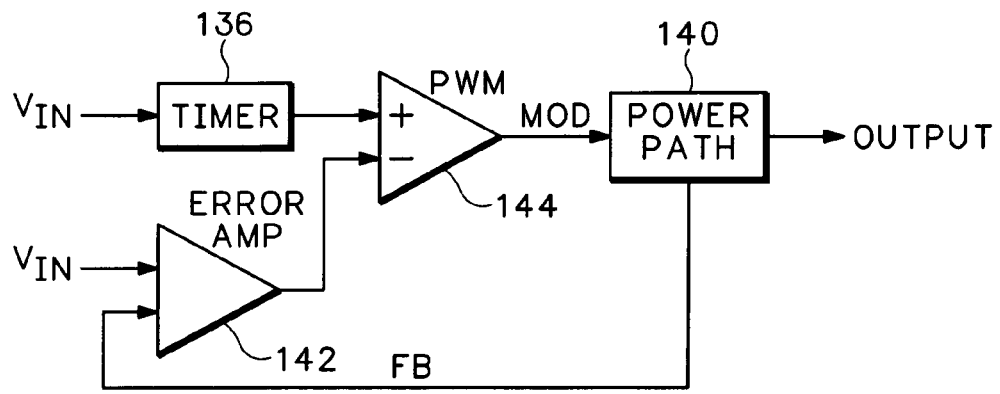
FIG. 4 illustrates how the embodiment of FIG. 3 may be implemented with PWM control according to the inventive principles of this patent disclosure.
Figure 5:
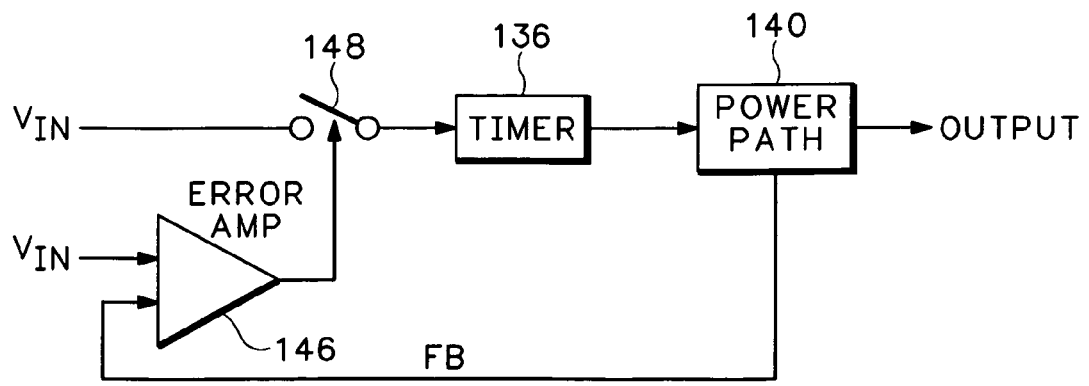
FIG. 5 illustrates how the embodiment of FIG. 3 may be implemented with PFM control according to the inventive principles of this patent disclosure.

FIG. 3 illustrates another embodiment of a switching power supply utilizing a controller arranged according to the inventive principles of this patent disclosure. The embodiment of FIG. 3 includes a timer 136, a modulation circuit 138, and a power path 140. The modulation circuit may embody any suitable control scheme, for example, a PWM or a PFM based controller that regulates the output in response to an input control voltage $V_{IN}$, and usually a feedback signal FB as well. Likewise, the power path 140 may be any suitable power conversion topology such as a buck converter, bridge converter, etc. Unlike a conventional switching power supply, however, the timer is designed so that the switching frequency varies in response to $V_{IN}$. As one possible example, the timer may be an oscillator designed to shift frequency by an amount that is proportional to $V_{IN}$, as would be the case with PWM. FIG. 4 illustrates how the embodiment of FIG. 3 may be implemented with PWM control. In another possible example, the timer may be a pulse generator designed to vary the pulse width by an amount proportional to $V_{IN}$, as would be the case with PFM. FIG. 5 illustrates how the embodiment of FIG. 3 may be implemented with PFM control.

Implementation

FIG. 6 illustrates another embodiment of a switching power supply utilizing a controller that combines and synthesizes several of the inventive principles of this patent disclosure. In the embodiment of FIG. 6, the window comparator is implemented with two comparators 112 and 114. A set/reset (RS) flip-flop (FF) 116 combines the outputs of the two comparators to generate the modulation signal MOD. One limit is provided as a bias signal $V_B$ by bias generator 118, while another limit is provide as a ramp signal $V_R$ by ramp generator 120. Although the controller of FIG. 6 may be used with any suitable switching topology, for purposes of illustration, it is shown in a simple DC-DC buck regulator arrangement having an output driver and switches 122, output inductor 124, and output filter/load 126. The power source is a DC supply voltage $V_{CC}$.

A feedback network is implemented as an error amplifier 128 which generates an error signal $V_{COMP}$ in response to an output signal $V_{OUT}$ and an input control signal $V_{IN}$ which provides a set point to the system. In this embodiment, the bias generator generates the bias signal in response to $V_{CC}$ and $V_{IN}$, while the ramp generator generates the ramp signal in response to $V_{CC}$, $V_{IN}$, and an output signal $I_{OUT}$. Many variations of these signal arrangements are contemplated under the inventive principles of this patent disclosure. For example, the output signal provided to the error amplifier 128 may represent the output current $I_{OUT}$ rather than voltage $V_{OUT}$, or it could represent any other suitable operating parameter of the power path such as the voltage or current through a specific inductor, switch, diode, etc. Likewise, the output drivers and switches may be configured as synchronous or asynchronous and operated in continuous or discontinuous (diode emulation) conduction mode.

FIG. 7 illustrates example waveforms of signals that may be obtained with the system of FIG. 6. In this example, the waveform $V_B$ is a steady (or quasi-steady) DC voltage depending on the input control signal. $V_{COMP}$ illustrates what the ripple in the error signal might appear as, and thus may be representative of the output ripple. The ramp signal $V_R$ includes a slope $S_R$ and a base level $V_{RO}$. The switching period T and on time $t_{ON}$ of the output driver are determined by the times at which the error signal $V_{COMP}$ crosses the limits. For example, at time $T_1$, the error signal reaches $V_B$ thereby turning the switch on for the interval $t_{ON}$ until the error signal reaches $V_R$ at time $T_2$. At this point, the switch turns off and $V_R$ is reset to $V_{RO}$ until $V_{COMP}$ reaches $V_B$ again at time $T_3$.

To better understand the versatility of a controller constructed according to the inventive principles of this patent disclosure, mathematical expressions may be defined for the particular signals involved. For example, the following expressions may be defined for the embodiment of FIG. 6:

$$V_B = A_1 V_{CC} + A_2 V_{IN} + A_3 V_{RO} \quad \text{(Eq. 1)}$$

$$S_R = \frac{1}{T_R}(B_1 V_{CC} + B_2 V_{IN} + B_3 V_{RO} + R_I I_{OUT}) \quad \text{(Eq. 2)}$$

where the terms $A_1$, $A_2$, $A_3$, $B_1$, $B_2$, and $B_3$ are scalars, $T_R$ is the slope gain of the ramp generator, and $R_I$ is the output current sense gain. These terms may then be adjusted to accommodate any particular application in which the controller is used.

Figure 8:
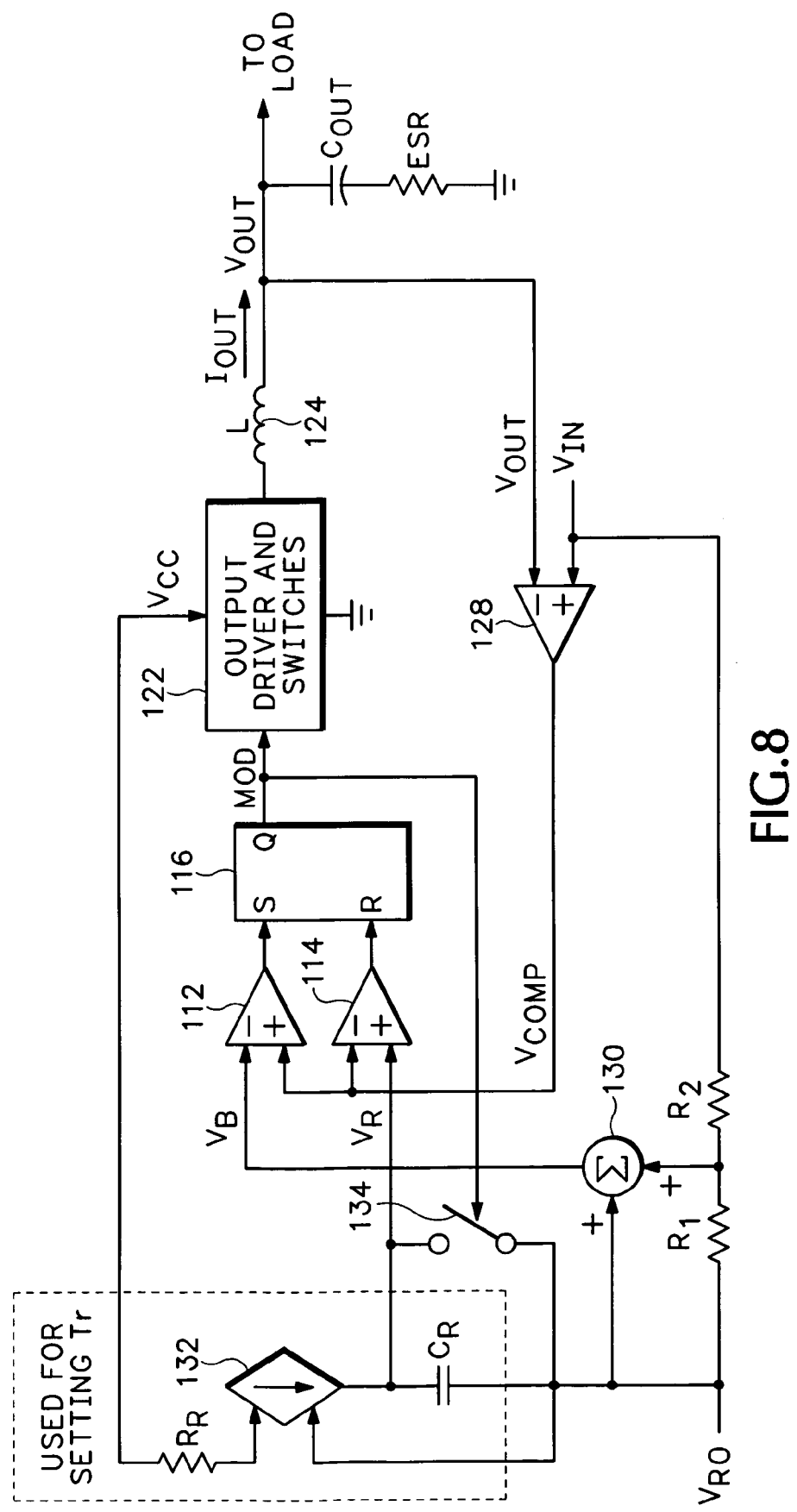
FIG. 8 illustrates another embodiment of a switching power supply utilizing a controller arranged according to the inventive principles of this patent disclosure.

For example, FIG. 8 illustrates an implementation in which the terms are set as follows:
$A_1=0$;
$A_2=0.5$;
$A_3$ is redefined as $1+(1-A2)$;
$B_1=1$;
$B_2=0$;
$B_3$ is preferentially zero, but set equal to −1 to facilitate easy implementation;
$R_1=0$; and
$T_R$ may be set to meet the requirements of the application.

If resistors $R_1$ and $R_2$ in FIG. 8 are defined as $A_2R$ and $(1-A_2)R$, respectively, then setting $A_2=0.5$ results in $R_1=R_2=R$.

In the embodiment of FIG. 8, the bias generator is implemented with resistive divider $R_1$, $R_2$ connected between constant voltage source $V_{RO}$ and input control voltage $V_{IN}$, and summing circuit 130 which sums $V_{RO}$ with the voltage at the midpoint of $R_1,R_2$. The ramp generator includes current source 132 which charges capacitor $C_R$ at a rate determined by $R_R$ and the difference between $V_{CC}$ and $V_{RO}$. Capacitor $C_R$ is discharged by switch 134 in response to the modulation signal MOD.

A salient feature of the embodiment of FIG. 8 is that the resistive divider $R_1$, $R_2$ introduces a frequency shift that varies in response to $V_{IN}$. Thus, the embodiment of FIG. 8 combines the principle of using a window comparator with a ramp limit with the principle of set-point dependent frequency shift in a synergistic manner to provide robust and versatile switching power supply control.

Depending on the implementation details, a switching power supply utilizing a controller arranged according to the inventive principles of this patent disclosure may provide output ripple control without directly feeding the output voltage into the pulse modulator; the use of an error amplifier may reduce or eliminate static error in the output voltage; and high speed response to load changes may be achieved running in both continuous and discontinuous conduction modes.

The inventive principles of this patent disclosure have been described above with reference to some specific example embodiments, but these embodiments can be modified in arrangement and detail without departing from the inventive concepts. For example, some signals are shown as representing specific voltages or currents and with particular polarities, but the inventive principles are not limited to these signal modes and polarities. Likewise, the inventive principles are not limited to the specific numbers or types of signals used by components such limit generators, feedback networks, etc. As a further example, the inventive principles illustrated above may be applied to multiphase converters. Thus, such changes and modifications are considered to fall within the scope of the following claims.

The invention claimed is:

1. A switching power supply controller comprising:
a modulation circuit to generate a modulation signal in response to an input control signal and a frequency signal; and
a timer to generate the frequency signal in response to the input control signal.

2. The controller of claim 1 where the modulation circuit implements PWM control.

3. The controller of claim 1 where the modulation circuit implements PFM control.

4. The controller of claim 1 where:
the modulation circuit comprises a comparator to compare a feedback signal to a first limit and a second limit; and
the first limit comprises a ramp.

5. The controller of claim 4 where the timer comprises a bias generator coupled to the modulation circuit.

6. The controller of claim 5 where the bias generator comprises:
a divider coupled between the input control signal and a voltage source; and a summing circuit coupled between the divider and the modulation circuit.

7. The controller of claim 1 where the modulation circuit comprises:
a PWM comparator to generate a modulation signal in response to a frequency signal and an error signal; and
an error amplifier coupled to the PWM comparator to generate the error signal in response to the input control signal and a feedback signal.

8. The controller of claim 1 where the modulation circuit comprises:
a switch circuit coupled to the time to control the modulation signal in response to an error signal; and
an error amplifier coupled to the switch circuit to generate the error signal in response to the input control signal and a feedback signal.

\* \* \* \* \*